(12) United States Patent
Liu et al.

(10) Patent No.: US 10,427,888 B1
(45) Date of Patent: Oct. 1, 2019

(54) ON-LINE WHEEL TRANSFER MECHANISM

(71) Applicant: CITIC DICASTAL CO., LTD, Qinhuangdao, Hebei (CN)

(72) Inventors: Weidong Liu, Hebei (CN); Honghai Zhou, Hebei (CN); Weizhi Zhang, Hebei (CN); Kuisheng Nie, Hebei (CN); Xing Wang, Hebei (CN); Qun Zhao, Hebei (CN)

(73) Assignee: Citic Dicastal Co., Ltd., Qinhuangdao (CN)

( * ) Notice: Subject to any disclaimer, the term of this patent is extended or adjusted under 35 U.S.C. 154(b) by 0 days.

(21) Appl. No.: 16/247,038

(22) Filed: Jan. 14, 2019

(30) Foreign Application Priority Data

Apr. 23, 2018 (CN) .......................... 2018 1 0364117

(51) Int. Cl.
*B65G 47/52* (2006.01)
(52) U.S. Cl.
CPC ................................ *B65G 47/52* (2013.01)
(58) Field of Classification Search
CPC ...................................................... B65G 47/52
USPC ................... 198/370.02, 370.07, 605, 774.1; 414/660, 728, 917
See application file for complete search history.

(56) References Cited

U.S. PATENT DOCUMENTS

| | | | | |
|---|---|---|---|---|
| 3,159,100 A * | 12/1964 | Marquiss | ............ | B41F 15/0872 101/126 |
| 4,064,675 A * | 12/1977 | Stapp | ...................... | B65B 57/00 493/313 |
| 4,085,566 A * | 4/1978 | Crowe | .................. | B65B 25/141 414/790.3 |
| 4,411,586 A * | 10/1983 | Zitser | ........................ | B22C 7/06 164/180 |
| 5,743,375 A * | 4/1998 | Shyr | ...................... | B65G 47/54 198/370.1 |
| 6,409,455 B2 * | 6/2002 | Moseley | .................. | B66F 9/04 254/10 R |
| 6,547,509 B1 * | 4/2003 | Edmo | .................. | B66F 7/0641 187/269 |
| 6,905,095 B1 * | 6/2005 | Gruzdeva | ................ | B60P 1/02 244/137.1 |
| 7,287,950 B2 * | 10/2007 | Schmeink | .............. | B21D 43/05 100/207 |
| 7,695,235 B1 * | 4/2010 | Rallis | ..................... | B65G 67/20 414/280 |
| 8,047,756 B2 * | 11/2011 | Tuffs | ...................... | B60L 15/38 198/463.3 |

(Continued)

*Primary Examiner* — Douglas A Hess
(74) *Attorney, Agent, or Firm* — Price Heneveld LLP

(57) ABSTRACT

The present invention includes an on-line wheel transfer mechanism. A cylinder, bearing seats and a linear guide rail are mounted on a base. A rack is connected to the linear guide rail through a guide rail seat, an output shaft of the cylinder is connected to the rack, and a rotating shaft A is mounted on the two symmetrical bearing seats. A gear and two rotating arms A are fixed on the rotating shaft A. The rack is engaged with the gear, a rotating shaft B is mounted on two symmetrical bearing seats B, two rotating arms B are fixed on the rotating shaft B, the rotating arms A are hinged to brackets through a rotating shaft C, and the rotating arms B are hinged to the brackets through a rotating shaft D. The rotating shafts constitute a parallelogram hinge four-bar mechanism.

3 Claims, 1 Drawing Sheet

(56) References Cited

U.S. PATENT DOCUMENTS

| | | | | |
|---|---|---|---|---|
| 8,870,515 B2* | 10/2014 | Weigl | ................... | B65G 49/067 |
| | | | | 294/219 |
| 9,249,001 B2* | 2/2016 | Lalesse | ................ | B65G 1/0407 |
| 9,351,569 B1* | 5/2016 | Lucey | .................. | B65G 1/0435 |
| 9,555,982 B2* | 1/2017 | Girtman | ................. | B25J 9/0093 |
| 10,023,403 B2* | 7/2018 | Roberts | ................. | B65G 47/53 |

* cited by examiner

ON-LINE WHEEL TRANSFER MECHANISM

CROSS REFERENCE TO RELATED APPLICATION

This application claims priority to Chinese Patent Application No. 201810364117.6 entitled ON-LINE WHEEL TRANSFER MECHANISM filed on Apr. 23, 2018, which is incorporated herein by reference for all purposes.

FIELD OF THE INVENTION

The present invention relates to a wheel machining device, specifically to an on-line wheel transfer mechanism.

BACKGROUND OF THE INVENTION

In the machining process of automobile wheels, the machined semi-finished wheels need to be completed by three procedures. The wheel transfer process requires a lot of time, and also increases the labor intensity of workers, which affects the production efficiency of a wheel machining enterprise to a certain extent and also increases the labor cost of the enterprise.

SUMMARY OF THE INVENTION

The objective of the present invention is to provide an on-line wheel transfer mechanism.

An on-line wheel transfer mechanism includes a roller bed A, a cylinder, a base, a linear guide rail, a rack, a guide rail seat, a rotating shaft A, bearing seats A, a gear, rotating arms A, bearing seats B, a rotating shaft B, a rotating shaft C, rotating arms B, brackets, a rotating shaft D and a roller bed B. the cylinder, the bearing seats A and the linear guide rail are mounted on the base. The rack is connected to the linear guide rail through the guide rail seat. An output shaft of the cylinder is connected to the rack, and the rotating shaft A is mounted on the two symmetrical bearing seats A. The gear and the two rotating arms A are respectively symmetrically fixed on the rotating shaft A, the rack is engaged with the gear, the rotating shaft B is mounted on the two symmetrical bearing seats B. The two rotating arms B are respectively symmetrically fixed on the rotating shaft B, the rotating arms A are hinged to the brackets through the rotating shaft C, and the rotating arms B are hinged to the brackets through the rotating shaft D.

The two rotating arms A and the two rotating arms B are equal in length. The plane composed of the two brackets, is parallel to the horizontal plane, and the rotating shaft A, the rotating shaft B, the rotating shaft C and the rotating shaft D constitute a parallelogram hinge four-bar mechanism.

When compressed air is introduced into the cylinder, the cylinder drives the rack to move along the linear guide rail, the gear drives the rotating arms A and the rotating arms B to rotate through the engagement between the rack and the gear, and due to the stability of the parallelogram hinge four-bar mechanism and the characteristic that the opposite bars are always parallel, the moving brackets are always parallel to the horizontal plane and move from the roller bed B to the roller bed A.

The on-line wheel transfer mechanism in use can meet the requirements of on-line wheel transfer, has the advantages of ideal effect, high efficiency, operational safety and reliability and high automation, and is particularly suitable for mass production on production lines.

In which, 1-roller bed A, 2-cylinder, 3-base, 4-linear guide rail, 5-rack, 6-guide rail seat, 7-rotating shaft A, 8-bearing seat A, 9-gear, 10-rotating arm A, 11-bearing seat B, 12-rotating shaft B, 13-rotating shaft C, 14-rotating arm B, 15-bracket, 16-rotating arm D, and 17-roller bed B.

DETAILED DESCRIPTION OF EMBODIMENTS

The details and working conditions of the specific device according to the present invention will be described in detail below in combination with the drawings.

Figure 1:
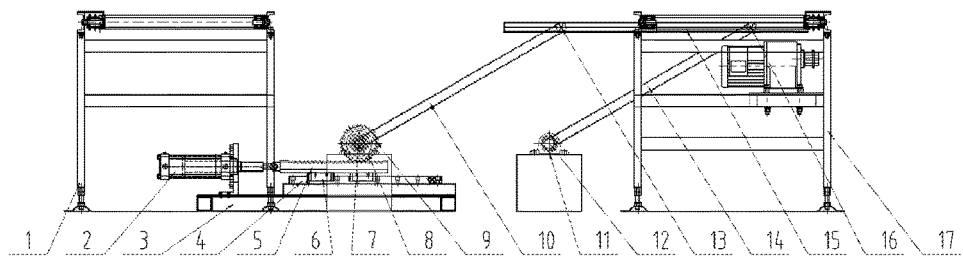
FIG. 1 is a structure diagram of an on-line wheel transfer mechanism according to the present invention.
Figure 2:
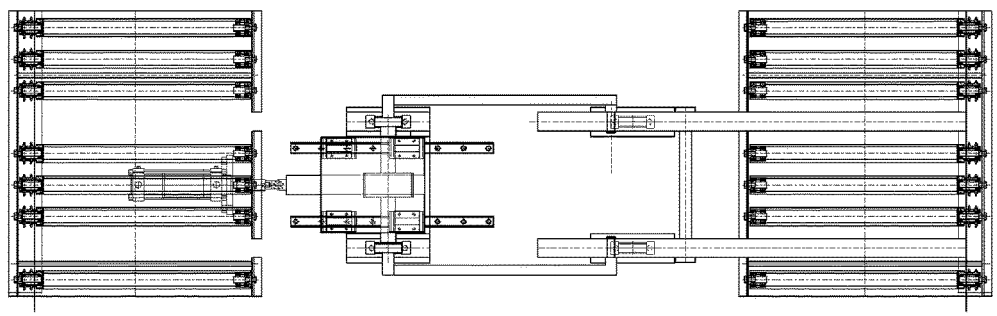
FIG. 2 is a top view of the on-line wheel transfer mechanism according to the present invention.

As shown in FIGS. 1 and 2, an on-line wheel transfer mechanism includes a roller bed A 1, a cylinder 2, a base 3, a linear guide rail 4, a rack 5, a guide rail seat 6, a rotating shaft A 7, bearing seats A 8, a gear 9, rotating arms A 10, bearing seats B 11, a rotating shaft B 12, a rotating shaft C 13, rotating arms B 14, brackets 15, a rotating shaft D 16 and a roller bed B 17. The cylinder 2, the bearing seats A 8 and the linear guide rail 4 are mounted on the base 3, and the rack 5 is connected to the linear guide rail 4 through the guide rail seat 6. An output shaft of the cylinder 2 is connected to the rack 5, and the rotating shaft A 7 is mounted on the two symmetrical bearing seats A 8. The gear 9 and the two rotating arms A 10 are respectively symmetrically fixed on the rotating shaft A 7. The rack 5 is engaged with the gear 9, and the rotating shaft B 12 is mounted on the two symmetrical bearing seats B 11. The two rotating arms B 14 are respectively symmetrically fixed on the rotating shaft B 12. The rotating arms A 10 are hinged to the brackets 15 through the rotating shaft C 13, and the rotating arms B 14 are hinged to the brackets 15 through the rotating shaft D 16.

The two rotating arms A 10 and the two rotating arms B 14 are equal in length. The plane composed of the two brackets 15 is parallel to the horizontal plane, and the rotating shaft A 7, the rotating shaft B 12, the rotating shaft C 13 and the rotating shaft D 16 constitute a parallelogram hinge four-bar mechanism.

When compressed air is introduced into the cylinder 2, the cylinder 2 drives the rack 5 to move along the linear guide rail 4, the gear 9 drives the rotating arms A 10 and the rotating arms B 14 to rotate through the engagement between the rack 5 and the gear 9, and due to the stability of the parallelogram hinge four-bar mechanism and the characteristic that the opposite bars are always parallel, the moving brackets 15 are always parallel to the horizontal plane and move from the roller bed B 17 to the roller bed A 1.

Before actual use, the output shaft of the cylinder 2 is in a contracted state, and the brackets 15 are under conveying rollers of the roller bed B 17. In actual use, a roller conveying system conveys a wheel to the brackets 15, then compressed air is introduced into the cylinder 2, the cylinder 2 drives the rack 5 to move along the linear guide rail 4, the gear 9 drives the rotating arms A 10 and the rotating arms B 14 to rotate through the engagement between the rack 5 and the gear 9. The moving brackets 15 are always parallel to the horizontal plane due to the stability of the parallelogram hinge four-bar mechanism and the characteristic that the opposite bars are always parallel, and lift the wheel. When the cylinder 2 continues to drive the rack 5 to move forward, the rotating arms A 10 and the rotating arms B 14 respectively rotate about the rotating shaft A 7 and the rotating shaft B 12, the brackets 15 finally move to the underside of conveying rollers of the roller bed A 1. The wheel is placed on the conveying rollers of the roller bed A 1, and then the roller conveying system of the roller bed A 1 transports the wheel away. The output shaft of the cylinder 2 drives the rack 5 to move reversely. Similar to the above movement process, the brackets 15 move from the roller bed A 1 to the roller bed B 17, and are reset. The above operations are continuously repeated to finally realize a wheel pipeline transfer function.

The invention claimed is:

1. An on-line wheel transfer mechanism, comprising: a first roller bed, a cylinder, a base, a linear guide rail, a rack, a guide rail seat, a first rotating shaft, first bearing seats, a gear, first rotating arms, second bearing seats, a second rotating shaft, a third rotating shaft, second rotating arms, brackets, a fourth rotating shaft and a second roller bed, wherein the cylinder, the first bearing seats and the linear guide rail are mounted on the base, the rack is connected to the linear guide rail through the guide rail seat, an output shaft of the cylinder is connected to the rack, and the first rotating shaft is mounted on two of the first bearing seats which are arranged symmetrically; the gear and two of the first rotating arms are respectively symmetrically fixed on the first rotating shaft, the rack is engaged with the gear, the second rotating shaft is mounted on two of the second bearing seats which are arranged symmetrically, two of the second rotating arms are respectively symmetrically fixed on the second rotating shaft, the first rotating arms are hinged to the brackets through the third rotating shaft, and the second rotating arms are hinged to the brackets through the fourth rotating shaft.

2. The on-line wheel transfer mechanism according to claim 1, wherein two of the first rotating arms and two of the second rotating arms are equal in length, a plane defined by two of the brackets is parallel to a horizontal plane, and the first rotating shaft, the second rotating shaft, the third rotating shaft and the fourth rotating shaft constitute a parallelogram hinge four-bar mechanism.

3. The on-line wheel transfer mechanism according to claim 1, wherein when compressed air is introduced into the cylinder, the cylinder is configured to drive the rack to move along the linear guide rail, the gear is configured to drive the first rotating arms and the second rotating arms to rotate through engagement between the rack and the gear, such that the moving brackets are always parallel to the horizontal plane and move from the second roller bed to the first roller bed.

* * * * *